ELECTRICAL PHONOGRAPH VELOCITY TRIP MECHANISM

Filed May 29, 1967 4 Sheets-Sheet 1

Inventor
John A. Rankin
By Brown, Jackson, Boettcher & Dienner
Attys.

April 14, 1970 J. A. RANKIN 3,506,270

ELECTRICAL PHONOGRAPH VELOCITY TRIP MECHANISM

Filed May 29, 1967 4 Sheets-Sheet 2

Inventor
John A. Rankin
By
Brown, Jackson, Boettcher & Dienner
Attys.

ELECTRICAL PHONOGRAPH VELOCITY TRIP MECHANISM

Filed May 29, 1967 4 Sheets-Sheet 3

Inventor
John A. Rankin
By Brown, Jackson, Boettcher & Dienner
Attys

April 14, 1970 J. A. RANKIN 3,506,270

ELECTRICAL PHONOGRAPH VELOCITY TRIP MECHANISM

Filed May 29, 1967 4 Sheets-Sheet 4

Inventor
John A. Rankin
By Brown, Jackson, Boettcher & Dienner
Attys

United States Patent Office 3,506,270
Patented Apr. 14, 1970

3,506,270
ELECTRICAL PHONOGRAPH VELOCITY TRIP MECHANISM

John A. Rankin, St. Joseph, Mich., assignor to V-M Corporation, Benton Harbor, Mich., a corporation of Michigan Filed May 29, 1967, Ser. No. 641,830
Int. Cl. G11b *17/02, 17/06*
U.S. Cl. 274—1 1 Claim

ABSTRACT OF THE DISCLOSURE

A structure for sensing the end of play of a phonograph record, particularly one which has a spiral lead-out groove, and for initiating a tripping function to provide a record changing cycle or shut-off cycle in the phonograph without the necessity of a tripping force being supplied by the tone arm, as is required in the usual mechanical velocity trip devices.

BACKGROUND AND SUMMARY OF THE INVENTION

Many record players and record changers have heretofore utilized mechanical tripping devices for indicating the end of play of a record. Some of these have operated when the tone arm has tracked the groove to a specific position whereupon the trip function is initiated. Tripping in response to position may be unsatisfactory if not all of the records to be played by the record player or record changer have been formed to end the record play at that position. As a means of overcoming that defect of position tripping, mechanical tripping devices have been utilized in which the velocity of the tone arm at the end of record play initiates the tripping function. This has been provided, for example, by having a lead-out spiral groove at the end of record play whereby an increased velocity of the tone arm is provided for initiating tripping.

In such mechanical tripping devices some mechanical force is required to initiate the tripping function and this may be harmful to the satisfactory playing of the record since, to take full advantage of the velocity component of the tone arm movement, and also to be independent of position, the mechanical trip is made ready for the tripping function substantially ahead of the position that corresponds to the end of play, and it is reset by the movement of the tone arm generally once each revolution of the turntable.

A recent development in sensing the end of play of a record, without requiring tripping force, is illustrated in the copending application of Robert J. Hammond and John F. Arent, Ser. No. 582,689, filed Sept. 28, 1966 in which the tripping action is responsive to energization of a photoelectric cell. Movement of the tone arm, as it is controlled by the needle which rides in the record groove, moves a shutter which is interposed between a beam of light and the photoelectric cell, until it is desired to effect a record changing cycle. Such structure, however, has the limitation of tripping when the tone arm reaches a specific position. Since records are not uniformly terminated at the same exact radius from the center spindle of a record player, this provides a limitation on the variety of records which can be played on the record player or record changer. Also records do not have uniformly sized record holes in all instances, some variations occurring from manufacture and others occurring from wear, but all variations affecting record changing which is done in response to the tone arm reaching a fixed distance from the center spindle.

With my improved invention I provide a device which senses the end of play of a record and initiates a tripping function without the tone arm applying mechanical force and is effective regardless of the varying length of record play of one or more records which may be played on the record player or record changer. I employ voltage generating means which, for example, may be a coil and a permanent magnet, with the magnet being adapted to be movable within and relative to the coil in order to generate a voltage. This relative movement is caused by the phonograph tone arm, particularly as it tracks the groove at its spiral lead-out portion. In the presently preferred arrangement the coil may be so positioned that a magnetic member, movable with the tone arm as it tracks the groove in the record, is inserted in the coil near the end of play of the record and then has a more rapid movement within the coil in response to tracking the spiral lead-out groove. This more rapid movement causes generation of a greater voltage which may be used to cause the tripping function. If needed, amplification may be provided.

So that the scope of my invention may be more readily appreciated, in another form of my invention voltage generating means in the form of a light source and photocell is provided, with a shutter mechanism being disposed between the light source and photocell. When the tone arm reaches that position of the record where the needle tracks the spiral lead-out groove, the shutter will permit a substantial amount of light to be transmitted to the photocell. The voltage generated may then be used to initiate the tripping function.

It will be appreciated that my invention could also be used merely as a means for sensing the end of play of a record in instances where the user of the record player requires or desires no initiation of a record changing cycle. Also sensing the end of play could be used as a means of initiating some other action, for example, starting a second record player.

DETAILED DESCRIPTION

In order that my invention can be better understood I shall initially describe in a general way the structure and operation of one form of record playing and record changing mechanism with which my invention is adapted to be associated.

GENERAL STRUCTURE AND TONE ARM SUPPORT

Figures 4, 6:
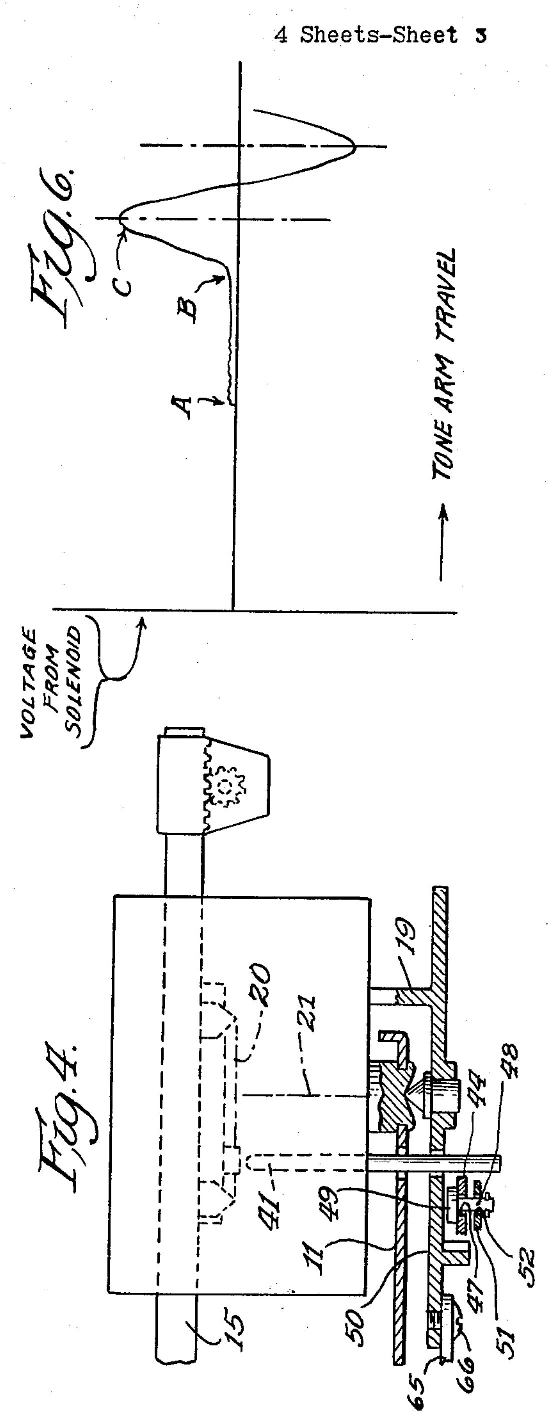
FIGURE 4 is a fragmentary view illustrating a coupling of the tone arm mounting to the change cycle mechanism.
FIGURE 6 is a graph showing generated voltage plotted against movement of the tone arm of the record player or record changer.

As shown in FIGURES 1 through 4, an automatic phonograph record changer 10 is provided with a base mounting plate 11 on which is rotatably mounted a turntable 12 driven by a motor in a conventional manner. At 15 is a tone arm pivotally mounted on the base plate 11 to one side of the turntable 12 and provided in the conventional manner with a transducer cartridge 16 adjacent its free end. Cartridge 16 includes a stylus 17 for tracking in the groove of a record as it is rotated with turntable 12 in order to reproduce sound in the usual manner, the record being properly centered on the rotating turntable by spindle 13. It will be understood that for proper operation of the tone arm 15, it must be mounted so as to be free to pivot around a vertically disposed axis in order that its stylus 17 may follow the groove in the rotating record and it must also be capable of pivoting about a horizontal axis to allow the stylus to be raised out of the groove at the completion of record playing and the tone arm removed to a rest position outside the periphery of the record to permit removal of the record or disposing a new record on the turntable over the player record. For the purposes of this invention any of the conventional arrangements known for mounting tone arm 15 which will permit this universal movement or pivoting of the tone arm about both a horizontal and a vertical axis may be utilized. FIGURE 4 illustrates one such mounting in a general way wherein tone arm 15 is shown mounted on a supporting yoke 19 for movement about horizontal axis 20, yoke 19 in turn being rotatably supported from bearings on plate 11 so as to be free to turn on a vertical axis 21 located to one side of turntable 12 and intersecting axis 20. Construction of such a tone arm mounting is illustrated and described in detail in the copending application, Ser. No. 445,525 of John F. Arent, filed Apr. 5, 1965 and owned by our assignee to which reference may be had for more complete understanding thereof and its operation, if desired.

RECORD LOWERING SPINDLE

Spindle 13 may be of the self-supporting type and is adapted to support a stack of records R′ in position above the turntable and includes means actuatable to release the lowermost record of the stack and drop or lower it to the turntable. Although the construction of such a spindle and its lowering mechanism is not a part of the present invention, preferably spindle 13 will be constructed as illustrated and described in copending application, Ser. No. 449,533 of Robert J. Hammond, filed Apr. 20, 1965 and owned by our assignee to which reference may be had for a more complete understanding of its construction and operation. However, so much thereof as is useful for an easier understanding of the present invention will now be described.

Figures 3, 7:
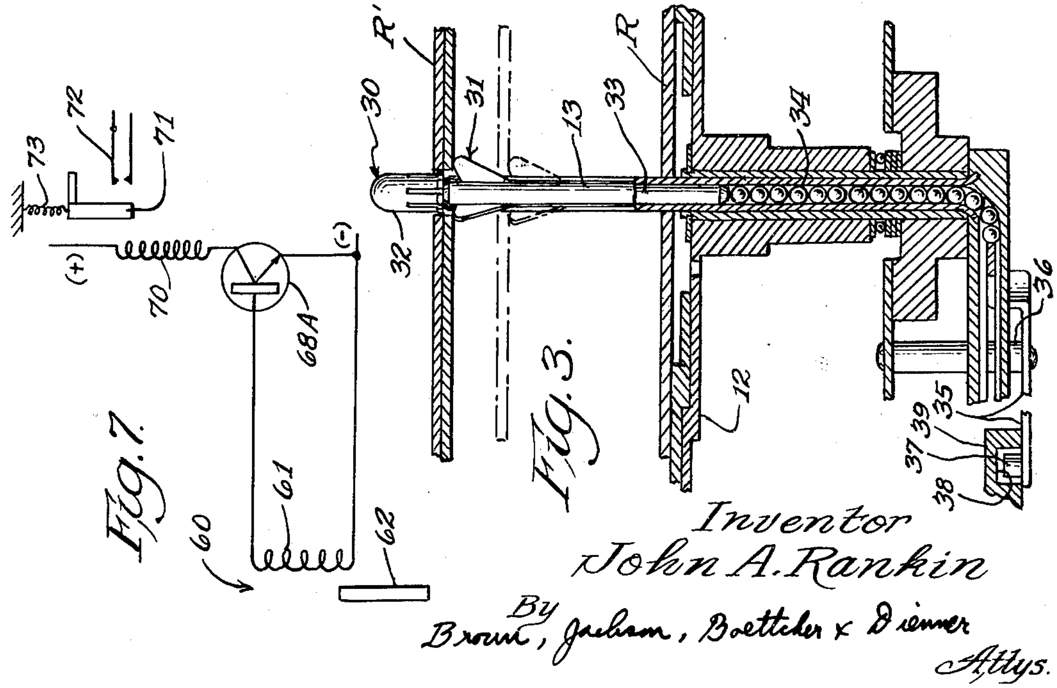
FIGURE 3 is a fragmentary view of one form of record lowering mechanism with which the invention may be utilized.
FIGURE 7 is a schematic wiring diagram showing another manner of initiating a record changing function, or other function.

Thus referring to FIGURE 3, spindle 13 is illustrated as comprising secondary record supporting means 30 and primary record supporting means 31. The secondary record supporting means comprises a cap 32, having its wall divided by vertical slots so as to comprise a plurality of spaced, downwardly extending fingers terminating in outwardly turned ribs positioned to be adjacent the periphery of the center hole of the next-to-lowermost record in the stack of records R′ supported on the upper end of the spindle. The primary record supporting means 31 comprises a plurality of retractable fingers which in their illustrated upper position project outwardly through vertical slots on the spindle body to support the stack by engaging beneath the lowermost one of the stack of records. Fingers 31 are movable downwardly to transport the lowermost record of the stack to the turntable 12 for playing. As they move downwardly the fingers are cammed inwardly of the spindle body by the bottom of the vertical slots to release the lowered record so that it is deposited on the turntable. At 33 is a rod to which said fingers are pivotally connected and from which they are biased outwardly by spring means (not shown). The vertical position of rod 33 is controlled by a train of balls 34 or other operative means. In the illustrated construction, the position of said balls 34 in the track is controlled by a lever 35 pivotally mounted at 36, having one of its arms in engagement with the last ball in said train of balls. The opposite arm of lever 35 supports a follower portion 37 which follows in track 38 on the underside of a rotatable cam 39. Cam 39 is drivingly connected with a motor 40 (FIGURES 1, 2 and 7) which is used as a power means for the record changing cycle. The configuration of cam track 38 is such that in one full rotation of the cam, lever 35 will be pivoted in a direction about 36 to first lower the train of balls in the body of spindle 13, from a height in the spindle where they support the rod 33 so that the fingers 31 support the stack by engaging the lowermost record of the stack, downwardly under the force of gravity to a level where the fingers will be retracted into the body of the spindle to effect dropping or lowering of the lowermost record onto the turntable 12. In the meanwhile the fingers of cap 32 support the remainder of the stack. Thereafter the lever 35 will be rotated by the cam in the opposite direction to return the balls to their original height during which movement fingers 31 rise and expand to support the stack which is then released to the fingers by the cap 32 as is more fully described in said Arent application, Ser. No. 445,525.

TONE ARM CONTROL

It will be recognized that in order to lower a record from the stack supported on the upper portion of spindle 13 at the completion of playing of a previously lowered record it will be necessary to also raise the tone arm so as to lift its stylus 17 out of the record groove and then to move the tone arm 15 outwardly a distance beyond the records to provide clearance for the next record to be lowered to the turntable by the spindle 13 for playing. Also after the record has been lowered to the turntable the tone arm must be moved inwardly to a position over the starting groove in the new record and then lowered to locate its stylus in said groove.

Synchronizing of the movement of the record lowering means and the tone arm are achieved by the cycling means which will now be briefly described. As previously mentioned, during record play the fingers comprising the primary record supporting means 31 are in their uppermost position illustrated in FIGURE 3 and support the record stack. During play of the record R on the rotating turntable, the tone arm moves inwardly toward the spindle 13 as its stylus 17 tracks in the record groove to reproduce sound. As the tone arm approaches the innermost end of the record groove, mechanism is actuated which serves to pivot the tone arm about axis 20 and thereby raise its stylus above the record groove, as by means of rod 41 (FIGURE 4). Mechanisms to raise the tone arm as by a rod, such as rod 41, are well known in the art and are therefore not necessary to be here particularly described. Once raised off the record, the tone arm is swung outwardly about vertical axis 21 by appropriate means, from beneath the record stack, to permit the lowermost record to be lowered by the previously described primary record supporting means 31. One means by which this is accomplished will now be described.

On the upper surface of cam 39 (the under surface of which cam provides track 38 (FIGURE 3) which controls the lowering of the primary record supporting means 31) are second and third tracks 42 and 43 (FIGURES 1 and 2) which synchronize and otherwise relate the movements of the tone arm 15 to the lowering of the primary record supporting means 31. Thus referring to FIGURE 2, at 44 is a lift plate shown pivotally mounted at 45 to the underside of base plate 11. One end of said lift plate 44 comprises a follower 46 tracking in the second track 42. The opposite end of lift end of lift plate 44 contains an arcuate shaped slot 47 (FIGURES 1 and 2) through which loosely extends the stem 48 (FIGURE 4) of a friction clutch member 49. Clutch member 49 is located so as to engage the underside of portion 50 of the tone arm's C-shaped yoke 19 (FIGURE 4) when lift plate 44 is pivoted on its mounting 45 in a direction to raise the clutch member. At 51 is a drive link having one end provided with an opening 52 (FIGURE 4) by which it is coupled to stem 48 of the friction clutch and having a roller 53 mounted at its opposite end following in cam track 43. At 54 is a cooperating link pivotally connected at one end to the underside of base plate 11 as by pivot pin 55 and at its opposite end to the drive link 51 at roller 53. As shown best in FIGURE 1, cam track 42 includes a short upper plateau section 56 on which follower 46 (FIGURE 2) of lift plate 44 rests during the playing of a record and during which interval cam 39 does not turn. In this position clutch plate 49 is disengaged from portion 50 of the tone arm mounting yoke 19 and tone arm 15 is therefore free to track the groove of the record as it is rotated by turntable 12.

Figure 1:
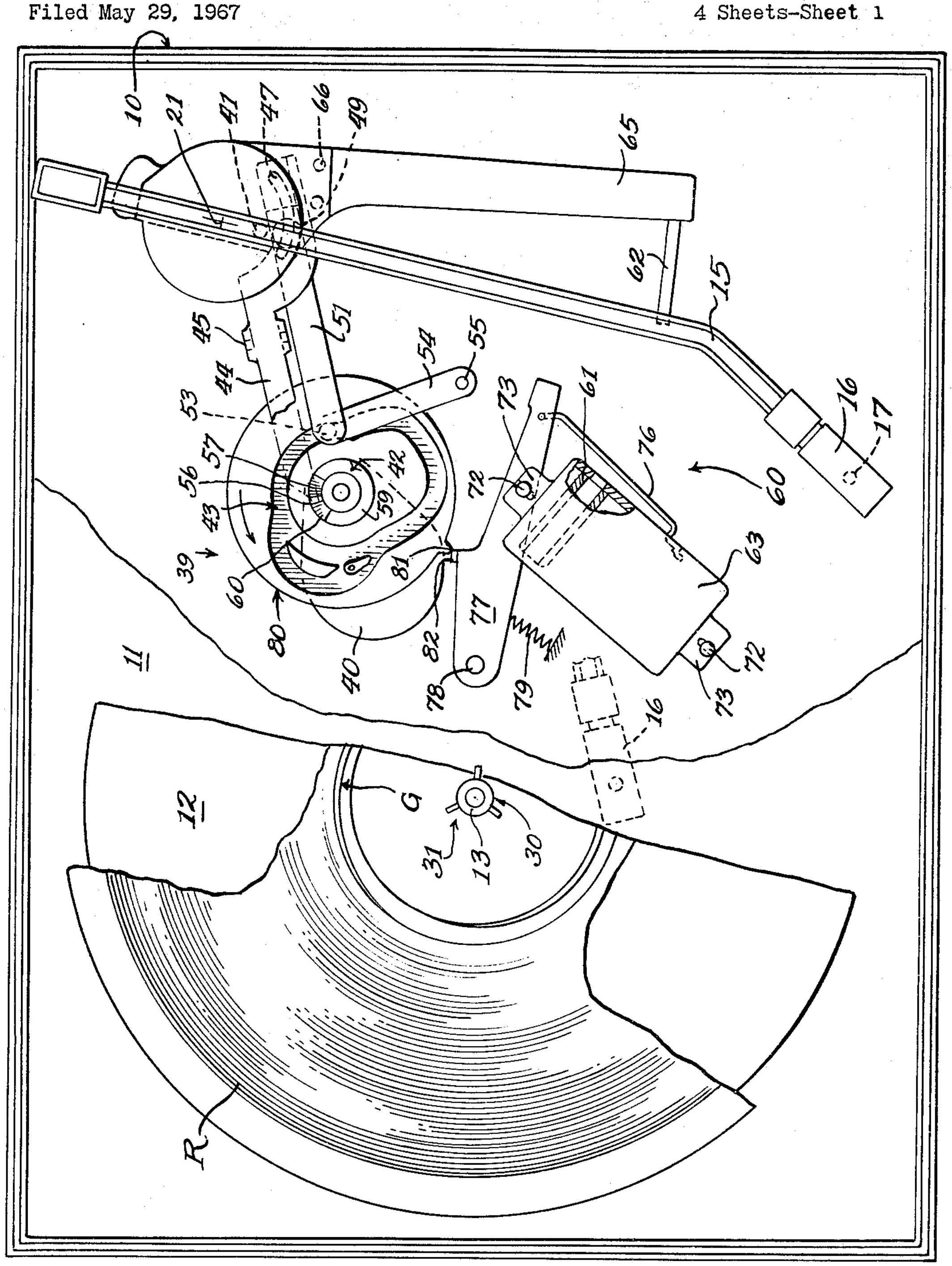
FIGURE 1 is a top plan view, partially broken away, of an automatic phonograph record player or record changer which incorporates my change cycle initiating mechanism.
Figure 2:
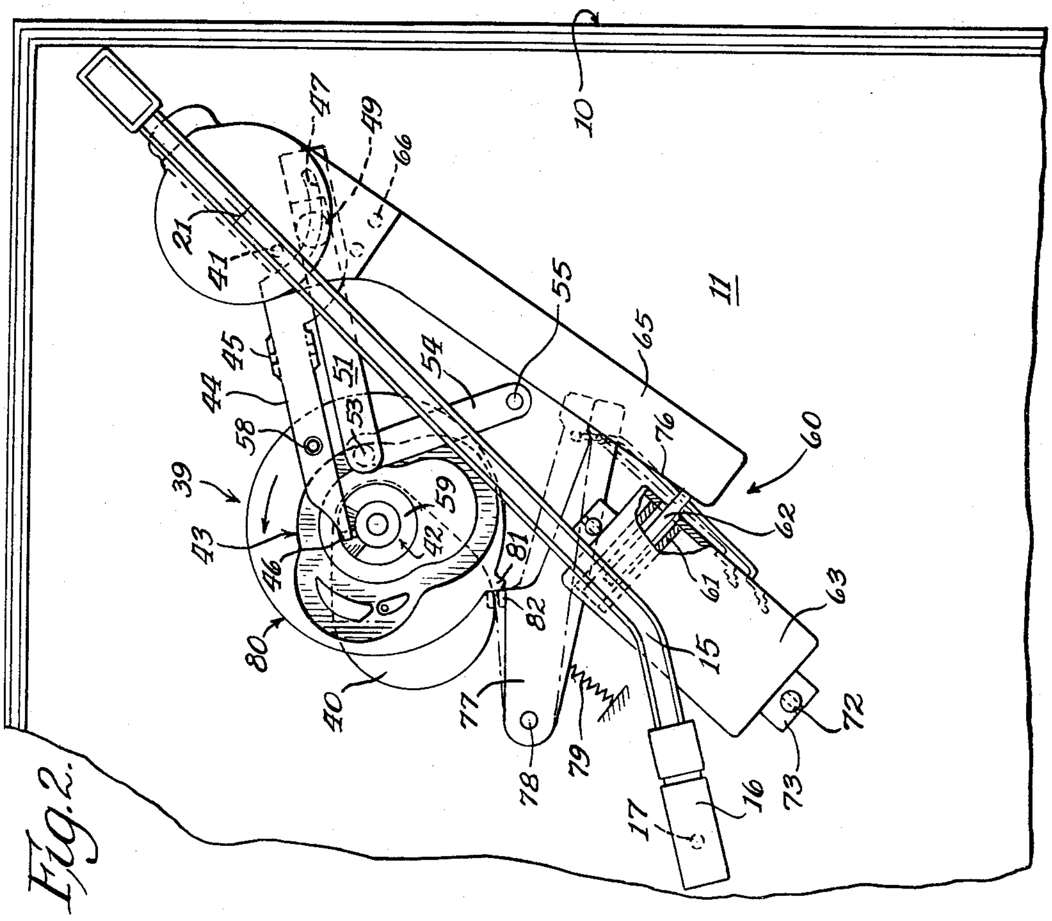
FIGURE 2 is a view generally similar to FIGURE 1 but showing the tone arm and change cycle initiating mechanism moved inwardly to a position approximating the end of record play.

At the completion of play of the record, tone arm 15 reaches the position illustrated in FIGURE 2 at which time means are brought into play, as afterwards described, to energize motor 40, causing cam 39 to turn. As illustrated in FIGURE 2, cam 39 rotates in a counterclockwise direction. Plateau 56 of cam track 42 is therefore now moved beyond follower 46 on arm 44, whereupon the follower moves along downwardly angled surface 57 (FIGURE 1) under the urging of a spring 58 (FIGURE 2) into arcuate portion 59 of the cam track so that lift plate 44 is rocked about its pivotal connection 45 raising friction clutch 49 into clutching engagement with the under surface of portion 50 of tone-arm yoke 19. Lift pin 41 is simultaneously raised and thereby raises the tone arm. Thereafter follower 46 continues in depressed portion 59 of cam track 42 so that the tone arm remains coupled to cam 39 as it is rotated by motor 40. For this purpose cam track 42 is circular in shape. Cam track 43, however, is shaped so that with the tone arm thus coupled to the cam, link 51 effectively moves the tone arm outwardly from beneath the stack of records, to permit a record to be dropped, after which the tone arm moves back to a start position over the lowered record. Timing of said tone arm movements to the lowering of the record is obtained by the related configuration and radial spacing of tracks 43 and 38 on the two sides of the cam 39.

SENSING END OF RECORD AND INITIATING CHANGE CYCLE

The foregoing structure and operation of a record changer is an example of one type of machine for which my invention is particularly well suited. It will be understood, however—particularly from the following description—that the invention may be used with other machines.

Figure 5:
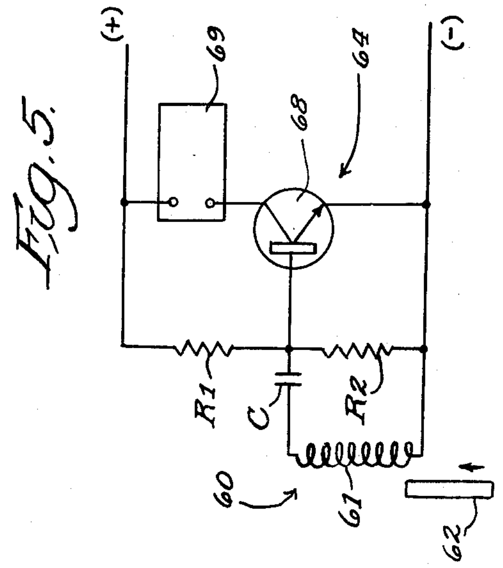
FIGURE 5 is a schematic wiring diagram for the illustrated record player or record changer.

Turning then to FIGURES 1, 2 and 5, means for sensing the end of play of the record R is indicated generally by the reference numeral 60. Essentially it consists of a solenoid 61 and a permanent magnet 62 which is adapted to fit within and move relative to the solenoid 61 for the purpose of generating a voltage in the wires forming the coil of the solenoid. Solenoid 61 is supported in a support or housing 63 (FIGURES 1 and 2) which also houses or supports portions of the electrical circuitry 64 which is diagrammatically shown in FIGURE 5. Housing 63 is mounted on the base 11 by fasteners 72 which pass through flanges 73 of the housing.

The permanent magnet 62 is carried on an arm 65, preferably constructed of non-magnetic material, which arm is bolted, as at 66 (FIGURE 4), to portion 50 of the tone arm's mounting yoke 19. Magnet 62 is so mounted on the arm 65 that, when it is moved by arm 65, its longer dimension follows an arc of a circle whose center is the vertical axis 21 about which the tone arm 15 pivots. When the tone arm 15 is in the position of FIGURE 1, the magnet 62 is disposed at a distance from solenoid 61 which is aligned to receive it. As the record is played and the tone arm tracks the groove in record R and approaches the spiral lead-out groove G, the magnet 62 begins to enter the solenoid 61 and the voltage which is generated by reason of the slow relatively steady movement of the magnet into the solenoid is represented on the graph of FIGURE 6 by the portion of the curve between points A and B. However, when the tone arm's stylus reaches the end-of-play portion of the record and enters the spiral lead-out groove G, the magnet enters the solenoid further and very much more rapidly with the result that a substantially greater voltage is generated—represented by the slope between points B and C on the curve of the graph of FIGURE 6. If the groove G is of the type which causes a recriprocating inward and outward movement, the subsequent voltage generated will be as shown, for example, on that portion of the curve after point C in FIGURE 6. Since not all spiral lead-out grooves have a spiral which causes such a reciprocating movement, it is desirable to rely on the voltage gradient between points B and C for initiating a record changing cycle.

If the selected characteristics of solenoid 61 and magnet 62 are such that the voltage output is low, amplification may be desirable and may be provided by the circuit shown in the schematic wiring diagram of FIGURE 5. There the voltage generated by magnet 62 moving in solenoid 61 is fed to transistor 68 which is biased by resistors R1 and R2 so that very little, if any, current flows in its collector circuit through load 69 during a steady state condition such as exists when the magnet 62 is gradually and steadily moving into the solenoid 61 when the stylus is tracking the record groove and reproducing sound. That condition is represented by the curve of FIGURE 6 between points A and B. Then as the voltage applied to the base of transistor 68 increases when the stylus tracks the spiral lead-out groove, represented by the curve of FIGURE 6 between points B and C, sufficient current is drawn to actuate the load 69 which may be a form of control mechanism such as a locking relay, or the motor 40 which is then kept going by a locking switch associated with the record changer mechanism.

In FIGURE 7 an alternate circuit is shown schematically in which the load 69 of FIGURE 5 is replaced by an electro-mechanical solenoid 70. Its plunger, or armature, 71 is mechanically coupled to the record changer for initiating a change cycle as by tripping a switch 72 in the circuit of a motor such as motor 40 of FIGURE 1. Armature 71 is connected with a spring 73 which urges the armature in a direction opposite to that exerted by the solenoid when the latter is energized. Since the solenoid is used to trip a mechanism such as switch 72, no holding action is necessary in the solenoid itself and the armature will be reset by spring 73. In this circuit the voltage wave form that results from the entrance of the magnet 62 into the solenoid 61 is so poled that the initial pulse caused by the movement of the tone arm in tracking the lead-out groove causes current to flow in the transistor 68A, thereby energizing the solenoid 70.

Figure 8:
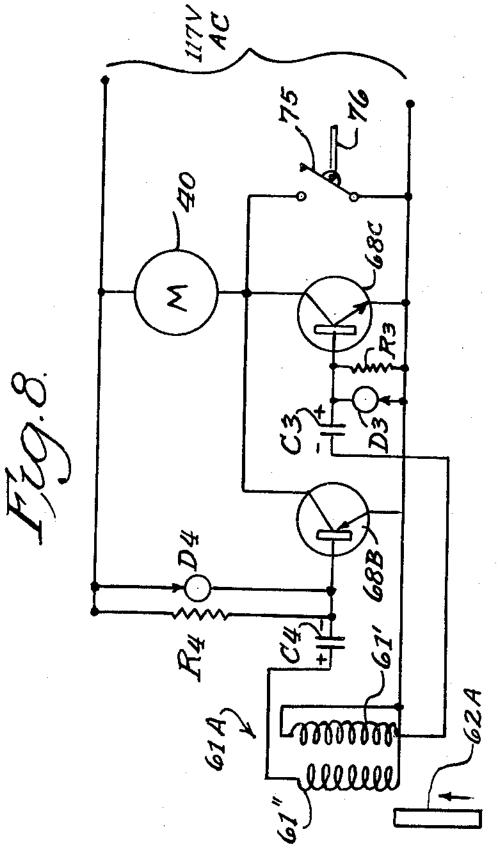
FIGURE 8 is a still another schematic wiring diagram.

In FIGURE 8 there is another schematically illustrated circuit in which the solenoid 61*a* has a double winding, represented by coil 61′ and 61″, so arranged as to obtain opposite polarities for the actuation of the two transistors 68B and 68C which are respectively PNP and NPN structures so that they may be used as switching devices to close the A.C. power circuit supplying power to the change cycle motor 40 without the necessity for a relay. Since the performance of the two transistor circuits is essentially the same, that associated with winding 61′ and transistor 68C will be explained. The voltage wave form generated in coil 61′ as the permanent magnet **62*a* is accelerated in the solenoid 61*a* by the lead-out groove provides, as heretofore mentioned, a greater velocity for the magnet than is provided by the pitch velocity of the playing grooves. In order for the motor to run a significant period of time longer than the positive duration of the voltage generated in coil 61′, a clamping or DC restorer circuit consisting of resistance R3, condenser C3 and diode D3 is interposed between the coil, or winding, 61′ and the transistor 68C. This operates in a conventional clamping fashion creating a voltage across C3 by virtue of the current drawn in D3, said stored voltage on C3 remaining in the polarity shown for a period longer than the positive excursion of the initiating voltage generated in coil 61′. The duration of the period that C3 is charged is strictly a function of R3, C3 and the input resistance of transistor 68C but can be made sufficiently long for the change cycle motor to initiate the change cycle in which case switch 75 is closed by the record change mechanism for the duration of the change cycle and at the end of the change cycle switch 75 is opened to stop the motor. In the circuit just described the voltage impulse generated in coil 61′ through the D.C. clamping circuit C3, D3, R3 controls the period 68C conducts. It will be seen that by virtue of the fact that A.C. power is applied to the series combination of motor 40 and transistor 68C, transistor 68C is only capable of conducting during the positive portion of the applied power frequency, therefore motor 40 would only receive power from the power source half of the time. In a like fashion, but arranged to conduct during the remaining or negative portion of the power cycle, transistor 68B together with the associated clamping circuit C4, R4, D4 are provided. This transistor in turn is actuated by a negative going voltage pulse generated in the second coil of solenoid 61A, namely, coil 61″. The combination therefore of the conduction of transistor 68C during the positive half cycle of the power frequency and the conduction of 68B during the negative half cycle of the power frequency provides full power to motor 40**.

Switch 75 may be closed by a link 76 (FIGURES 1 and 2) which is connected with an arm 77 pivoted at 78 and urged by a spring 79 toward the rotatable cam 39. Cam 39 has an outer periphery 80 and a projection 81 toward which a cam follower flange 82 of arm 77 is urged during the playing cycle when the tone arm is tracking the playing groove of the record R. When motor 40 is energized for driving the cam and initiating the record changing cycle through the circuit of FIGURE 8, for example, as soon as the cam 39's motion is begun the cam follower flange 82 of arm 77 will ride down from the protrusion 81 onto the cam surface 80 under the urging of spring 79 and this will cause the arm 77 to move the link 76 to close switch 75. At the end of the record change cycle the cam 39 will have made one revolution and protrusion 81 will have come around and again engaged the cam follower flange 82 on arm 77 and cause it to move in a clockwise direction against the urging of spring 79 whereupon link 76 will move to open switch 75 thereby de-energizing the motor 40.

While I have described above the use of the voltage generation as means for initiating a record changing cycle, it will be appreciated that it could also serve to activate shut-off mechanism for turning off the record player.

If desired, the voltage generation could be used merely to cause a signal that the end of the record play is about to occur. In a broadcasting studio, for example, a lamp could be lit as a signal to the "disc jockey."

In place of carrying the permanent magnet on an arm such as has been illustrated in FIGURES 1 through 4 a modification can be employed wherein a rotary magnet is fixed directly on the shaft of the tone arm spindle and disposed around it is a motor type winding in which the voltage is generated. An increase in generated voltage would occur when the spindle is rotated more rapidly in response to the tone arm's stylus tracking in the lead-out groove of the record.

Figures 9, 10:
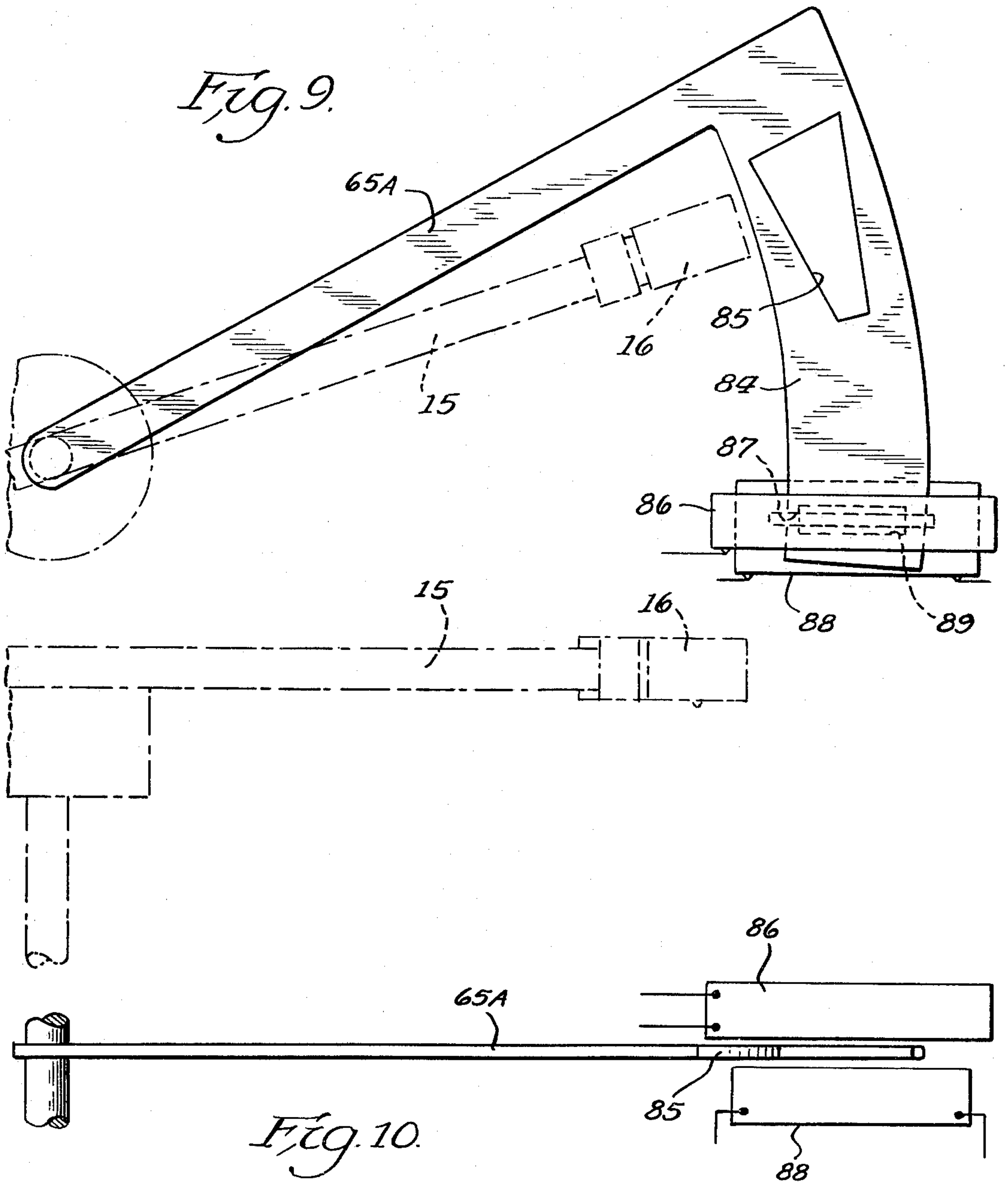
FIGURE 9 is a top plan view of a fragmentary showing of modified mechanism for sensing the end of play of a record.
FIGURE 10 is an elevational view of the mechanism of FIGURE 9 taken approximately on the line 10—10 of FIGURE 9.

Another arrangement is that illustrated in FIGURES 9 and 10 where I have diagrammatically shown an arm 65A which is adapted to rotate along with the tone arm as it tracks the record groove and which supports a shutter structure 84 which has an aperture 85. The shutter is disposed between a light box 86 which has an aperture 87 for direction of light toward a photocell 88 which is on the opposite side of the shutter 84 and has an opening 89 through its housing. As the tone arm rotates toward the center of the record in the direction shown by the arrow the amount of light that falls on the photocell 88 gradually increases as the wider portion of the aperture 85 of shutter 84 lets more light through from the light box 86. When the tone arm reaches the spiral lead-out groove, such as groove G of FIGURES 1 and 2, a larger area of the aperture 85 will be much more rapidly brought into alignment with the aperture 87 in the bottom of the light box and therefore will permit a rapid increase in the transmission of light to the photocell and a substantial acceleration in the voltage output which may be used in the circuits heretofore described.

While I have described my invention most particularly by reference to preferred forms thereof I do not intend to be limited thereto except insofar as the appended claims are so limited, since modifications coming within the scope of my invention will readily suggest themselves to one skilled in the art who has my disclosure before him.

I claim:

1. For use in sensing the end of play of a phonograph record, coil means comprising a pair of coils, magnetic means connected to a tone arm adapted to track the groove in the phonograph record to play the record, said magnetic means being adapted to be movable in and relative to said pair of coils, said relative movement of the magnetic means in the pair of coils being initiated when the phonograph's tone arm reaches a certain position in the record groove it is tracking, a load adapted to be powered at the end of play of a phonograph record by a source of alternating current, and a control circuit responsive to the voltage generated by the relative movement between said magnetic means and coil means for controlling the delivery of power to said load, the control circuit including two transistors each in series with one of the coils and said load, and with a clamping circuit associated with each transistor, said transistors respectively controlling the flow of current to said load during positive and negative portions of the power cycle.

References Cited

UNITED STATES PATENTS

| | | | |
|---|---|---|---|
| 2,345,684 | 4/1944 | Pressley | 192—118 |
| 3,248,470 | 4/1966 | Markowitz et al. | 84—1.26 X |
| 2,085,582 | 6/1937 | Guedon | 274—1.11 X |

HARRY N. HAROIAN, Primary Examiner

U.S. Cl. X.R.

274—15